United States Patent [19]

Willman

[11] Patent Number: 5,029,894
[45] Date of Patent: Jul. 9, 1991

[54] RETRACTABLE MOTORCYCLE STOP-SUPPORT WHEELS

[76] Inventor: David M. Willman, 1234 Margine Ave., Daytona Beach, Fla. 32114

[21] Appl. No.: 501,471

[22] Filed: Mar. 30, 1990

[51] Int. Cl.⁵ .......................... B60R 27/00; B62H 1/12
[52] U.S. Cl. .................................. 280/755; 280/293; 280/301; 180/209
[58] Field of Search ............... 280/293, 297, 301, 302, 280/303, 298, 299, 300, 755, 704, 80.1, 149.1, 149.2, 43.1, 43.13, 301; 180/209

[56] References Cited

U.S. PATENT DOCUMENTS

| | | | |
|---|---|---|---|
| 3,397,898 | 8/1968 | Denney et al. | 280/755 |
| 4,536,009 | 8/1985 | Ashworth | 280/755 |
| 4,815,756 | 3/1989 | Kitner | 280/755 |
| 4,826,194 | 5/1989 | Sakita | 280/755 |

Primary Examiner—Richard A. Bertsch
Attorney, Agent, or Firm—Edward M. Livingston

[57] ABSTRACT

A motorcycle is provided with retractable stop-support side wheels (1) parallel to the back wheel (44). The side wheels (1) lock in place when down at each side of the motorcycle for stop-and-start driving, for parking and for handling the motorcycle when it is not being ridden. Hydraulic cylinders (14) are employed to activate struts (2) on which the side wheels (1) are positioned pivotally at either the outside edge of crash bars (5) of motorcycles having suitable crash bars or between top mounting positions (59) for crash bars and bottom crash-bar and foot-rest mounting means (58) for motorcycles not equipped with suitable crash bars. An attachment angle bracket (3) is shaped for various types of motorcycles for pivotal attachment of the struts (2). Manual or automatic operations with selective-speed up-and-down actuation are optional.

33 Claims, 4 Drawing Sheets

RETRACTABLE MOTORCYCLE STOP-SUPPORT WHEELS

BACKGROUND OF THE INVENTION

This invention is related to side wheels for motorcycles and in particular to side wheels which are retractable when not in use and extendable for assistance in stop-and-start driving, slow-speed operation and parking.

Since the introduction of motorcycles, there have been various attempts at holding them upright and yet allowing the pleasure of balancing them when riding. Motorcycling is an intriguing extension of the individual rider. It provides satisfaction from its accomplishment without the aid of side wheels. Most development in balancing motorcycles, therefore, has been confined largely to improvement of kickstands and other minor aids to holding them upright when stopped. Notably different, however, have been some side wheels that follow the curves of the road and allow a rider to tip when turning. But such aids have not been successful as a result of a desire of nearly all who ride to balance for themselves. Consequently, this invention provides a balancing aid for use when the motorcycle is in stop-and-start operation as an option to match the needs and capabilities of all riders while still maintaining the balancing motivation and achievement of motorcycling when riding.

For even the strong and daring, however, large touring motorcycles are cumbersome and dangerous to handle when not being driven and when stopping and starting. Non-driving burdens and problems do not provide pleasure from motorcycling. This invention alleviates the unpleasant and unrewarding features of motorcycling, particularly tour cycling with large touring motorcycles.

A major feature not addressed in motorcycling is that it is participated in often jointly with a partner who may not be able to handle a large motorcycle or even a tall, light motorcycle during stop-and-start operations. The social aspect limits the amount of motorcycling that will be engaged in by even ardent enthusiasts of the sport. A large motorcycle that is optionally as challenging as the strongest riders desire and yet so nimble and easy to handle that a delicate, small lady can master it with pleasure can satisfy all types of individuals. A female cycling passenger can become an addict of the sport with this invention.

Relatively affluent, generally elderly and often partially incapacitated individuals comprise a large portion of large-motorcycle touring enthusiasts. For them, the practicality of avoiding the burdens and problems of motorcycling are particularly significant and often crucial.

Psychological studies have shown that the greatest dangers to motorcycling are related to stop-and-start traffic conditions and parking. This is mostly because increased attention is required at the same time that handling the motorcycle also demands attention. Safety is too often the loser.

Further, it has been found that mood and emotional conditions of riders fluctuate in ways that make motorcycling sporadically dangerous for even the best cyclists. For those mental conditions in which the dangers of stop-and-start driving require vehicle stability like that of an automobile, this invention is particularly advantageous. It is for all.

Patents found in the art include the following: U.S. Pat. No. 4,637,624 Shar Jan. 20, 1987 U.S. Pat. No. 4,638,880 Togashi Jan. 27, 1987 U.S. Pat. No. 4,693,488 Bermecco Sept. 15, 1987 U.S. Pat. No. 4,223,906 Gratza Sept. 23, 1980 U.S. Pat. No. 4,133,402 Soo Hoo Jan. 9, 1979 U.S. Pat. No. 4,095,823 Nishida Jun. 20, 1978 U.S. Pat. No. 3,980,150 Gigli Sept. 14, 1976

Most of these are so related to kickstands that comment does not appear to be merited. Two of them, the Soo Hoo and Gigli patents, relate to wheeled undercarriage supports. They are different from this invention in that they are devised to replace the balancing feature of motorcycling, rather than to stop-and-start conditions at low cost optionally. Although both the Soo Hoo and Gigli devices are optional and can be used for stop-and-start driving as well as for fast driving, they are less stable for stop-and-start driving, for parking and for handling when not driving. They provide expensive features which cyclists desire to avoid. In particular, they feature tip-adjustment, springs and terrain-contour adjustment that are neither needed for safety nor warranted to derogate the pleasure of motorcycling.

SUMMARY OF THE INVENTION

One object of this invention is to provide low-cost, convenient, safe, reliable and attractive side wheels for large motorcycles which are used generally for touring.

Another object is to provide upright stability of a motorcycle in stop-and-start traffic.

Another object is to provide upright stability for stopping, starting and parking a relatively large motorcycle for individuals with relatively short legs, for individuals whose psychological conditioning hinders sufficient attention for safety in stop-and-start traffic, for individuals whose mental and emotional state at the time of driving hinders safety in stop-and-start traffic, for individuals whose legs are not sufficiently strong to hold up a large motorcycle and for individuals whose legs may be incapacitated.

Another object is to provide upright stability at an optional basis for different drivers.

Another object is to provide upright stability on an optionally manual or automatic basis.

Still another object is to provide automatic upright stability at selectively different speeds for up-and-down actuation of retractable side wheels.

The present invention accomplishes the above and other objects providing a motorcycle with retractable stop-support side wheels parallel to the back wheel. The side wheels lock in place when down at each side of the motorcycle for stop-and-start driving, for parking and for handling the motorcycle when it is not being ridden. Hydraulic cylinders are employed to activate struts on which the side wheels are positioned pivotally at either the outside edge of crash bars of motorcycles having suitable crash bars or between top and bottom mounting positions for crash bars for motorcycles not having suitable crash bars. A mounting angle bracket is shaped for various types of motorcycles for pivotal attachment of the struts. Manual or automatic operation with selective-speed up-and-down actuation are optional.

BRIEF DESCRIPTION OF THE DRAWINGS

The drawings which are used to illustrate the preferred embodiments the invention are as follows.

DESCRIPTION OF THE PREFERRED EMBODIMENTS

Figures 1, 2:
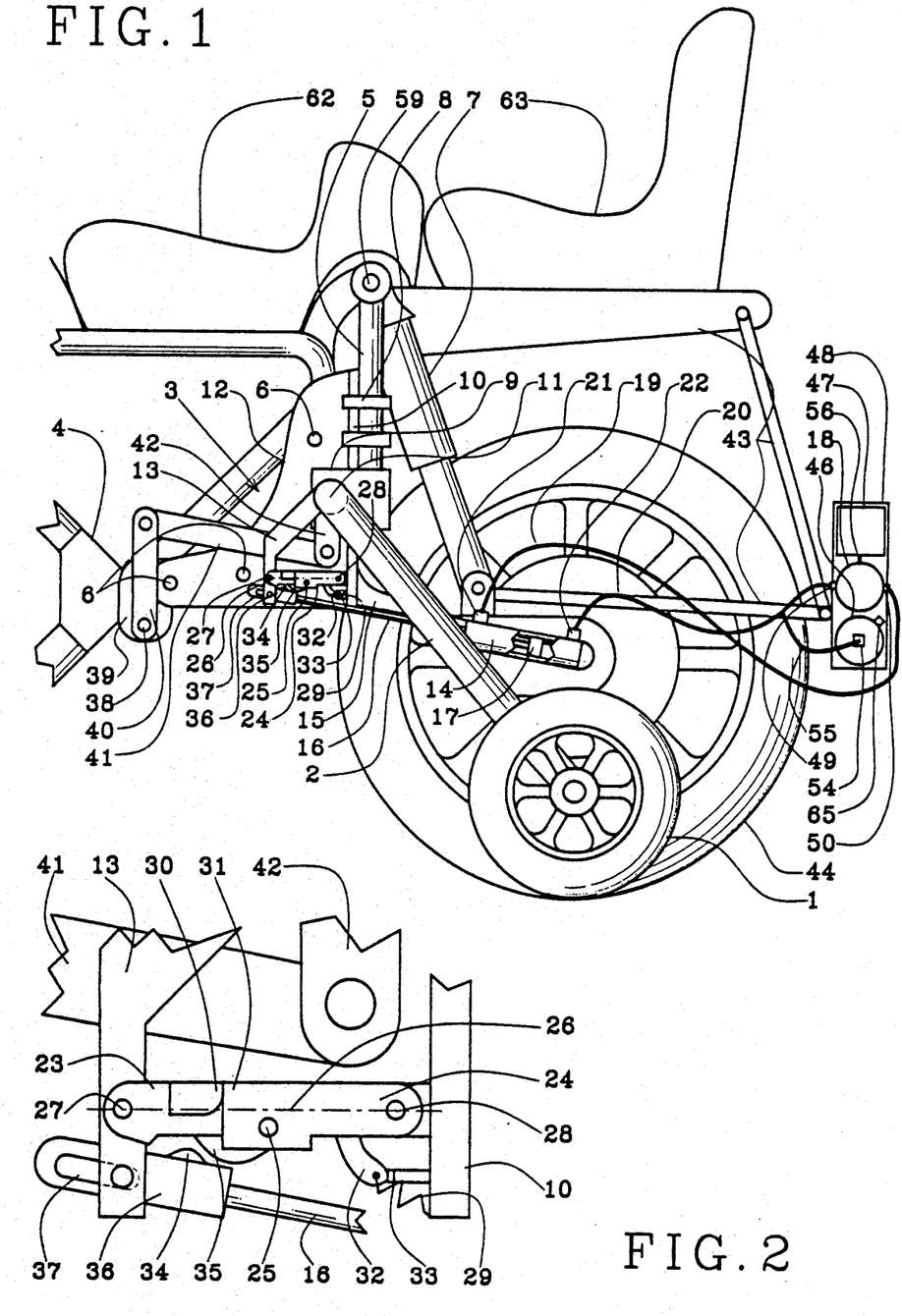
FIG. 1 is a sectional cutaway left-side view of the rear section of a motorcycle with the left side wheel down and with the fender and covering parts of the motorcycle omitted for exposing components of the invention.
FIG. 2 is an enlarged sectional view of a mechanical wheels-down locking mechanism employed to assure that wheels stay down for safety when being stopped, started, parked, worked on, moved or otherwise handled when not being ridden.

Referring to FIG. 1, a stop-support wheel 1 is rotatably attached to a strut 2. The strut 2 is pivotally attachable to a dihedral-angled attachment bracket 3 that is attachable to motorcycle frame 4. The attachment bracket 3 can be attached to a suitable crash bar 5 at the top bracket 3 and to the frame 4 at suitable frame bolt positions 6 at the bottom of the bracket 3. Alternatively, the bracket 3 can be attached to suitable frame attachment means in the vicinity of attachment means for attaching a shock absorber 7 and an optional crash bar 5. for attachment of the bracket 3 to a crash bar 5, various conventional attachment means 8 can be utilized. A strut-pivot bearing member 9 is attachable to an attachment-bracket outside wall 10. A strut pivot axle 11 is pivotally attachable to a strut-pivot bearing member 9 and can be pivotally anchored to attachment-bracket inside wall 12. The strut-pivot bearing member 9 can be a simple U clamp or a sophisticated bearing.

To retract or to extend the stop-support wheel 1, a strut-actuation arm 13 is extended at a suitable angle from the strut-pivot axle 11 and swiveled by means of a hydraulic cylinder 14 attached pivotally to a cylinder bracket 15 that is attached rigidly to attachment bracket 3. A piston shaft 16 is attached pivotally to the strut-actuation arm 13 and actuated linearly in both directions by a piston 17. Hydraulic fluid is pumped into and out from the cylinder 14 with hydraulic pump 18 through the wheels-up line 19 and wheels-down line 20 at respective wheels-up-line attachment 21 and wheels-down-line 22 to the cylinder 14.

Referring to FIGS. 1 and 2, the strut 2 can be locked mechanically in a wheels-down position by preventing the strut-actuation arm 13 from pivoting with in-line positioning of front over-lock arm 23 that is pivotally attachable to actuation arm 13 and rear over-lock arm 24 that is pivotally attachable to attachment-bracket outside wall 10. The front and rear over-lock arms 23 and 24 are pivotally attachable to each other and at an over-lock pivot position 25. An over-locking arrangement occurs when the over-lock pivot position 25 traverses an over-lock centerline 26 between front-over-lock-arm pivot-point 27 and rear-over-lock-arm pivot-point 28. The over-locking arrangement is maintained by a rotational bias with lock spring 29 in a wheels-down swivel direction to where a front lock shoulder 30 on front over-lock arm 23 is buttressed against rear lock shoulder 31 on rear over-lock arm 24.

Referring further to FIGS. 1 and 2, wheels-down directional pumping of fluid by hydraulic pump 18 is stopped automatically when switch arm 32 on rear over-lock arm 24 is caused to engage shut-off switch 33 which is connected to electrical lines that operate the hydraulic pump 18. Wheels-up directional pumping by hydraulic pump 18 actuates piston-shaft-shoulder cam 34 against front-over-lock-arm cam 35 to position the over-lock-pivot-position 25 at an unlocked side of the over-lock centerline 26 to allow the stop-support wheels 1 to be raised. The piston-shoulder cam 34 is attached to a piston-shaft shoulder 36 with an actuation-over-stroke slot 37 that allows travel of the piston shaft 16 in a wheels-up direction without raising the wheels 1 until the over-lock arrangement is in an unlocked position with the over-lock position at the opposite side of the over-lock centerline 26 from the locked position illustrated.

Referring yet further to FIGS. 1 and 2, up-and-down positioning of stop-support wheels 1 at both sides of a motorcycle frame 4 can be equalized by means of a torque arm 38 positioned under and extended from side-to-side of frame 4. There is no straight-through vacancy at the position of the strut-pivot axle 11 in most present motorcycles. It is possible, however, to construct motorcycles with such a vacancy. In the event that motorcycles are constructed with such a vacancy for utilizing this invention, one cylinder arrangement, rather than two, can be employed in the same working relationship. Alternatively also, a hydraulic equalization system can be employed as described below. The torque arm 38 is attachable pivotally to a torque-arm attachment extension 39 from the attachment-bracket inside wall 12. A torque-arm lever 40 is attachable rigidly to the torque arm 38 and attachable pivotally to a torque-arm connector 41. An equalizer lever 42 can be attached rigidly to the strut-pivot axle 11 at suitable angle between the strut 2 and the strut-actuation arm 13. Also, the working relationship of the torque arm 38 can be utilized with suitable construction for operating struts at both sides of frame 4 with a single hydraulic cylinder at one side.

Reference is made now to FIGS. 1, 3, 5 and 6 in relation to the hydraulic system. Typically supported by luggage-rack and rear-fender braces 43 behind a motorcycle real wheel 44 for add-on units are an electrical pump motor 45, hydraulic pump 18, accumulator 46 and overflow tank 47. These components can be positioned separately on a motorcycle or grouped in a figurative hydraulics case 48. Either the motor 45 or the pump 18 can be reversible to pressurize hydraulic fluid through the wheels-down line 20 for lowering the wheels 1 through wheels-up line 19 for raising wheels 1. The wheels 1 on struts 2 can be held in an up or down position or at any position in between up and down by shutting off fluid flow at pump-down valve 49 and pump-up valve 50 at the pump 18 by a pump switch 51 in proximity to a driver of a motorcycle. The pump switch 51 can be positioned on preferably the right handlebar of a motorcycle or such other location as preferred.

Preferably for safety and reliability with unlike duplicity, the mechanical over-lock system can be employed in conjunction with a wheels-down emergency system with or without the above optional electrical-switch operation of the valves 49 and 50. A high level of safety is provided for individuals who can not hold a motorcycle up with their legs and feet when the motorcycle is stopping or starting. Their life is in danger to drive a motorcycle at all if the stop-support wheels 1 are not as reliable as the legs of a strong motorcyclist. With this invention, the stop-support wheels 1 are far more reliable than the legs of any rider. This maximized safety factor is one of the fundamental features of this invention.

The emergency wheels-down hydraulic system is actuated by pressure in the accumulator 46 that is released by an emergency handle 52 in convenient proximity to a driver. There can be mechanical or hydraulic communication through emergency wheels-down line 53 from the handle 52 to accumulator-release valve 54. Pressurized gas or liquid in accumulator 46 is directed against hydraulic fluid in wheels-down line 20. This causes wheels 1 to be extended downwardly immediately and locked by the aforesaid over-lock system. This emergency wheels-down hydraulic system is employed only if there is an electrical failure and stop-support wheels are necessary for the particular driver. Until system electricity is available, the wheels 1 will remain in locked position down. Travel at speeds of 35 miles per hour is safe on relatively side-to-side level terrain with slow turns for purposes of obtaining assistance. A backup electrical source 55 also can be employed to assist an electrically locking system and/or an over-lock system as further duplicity for safety of individuals who prefer a higher safety factor equal to automobiles and yet like the thrill of motorcycling.

Figure 5:
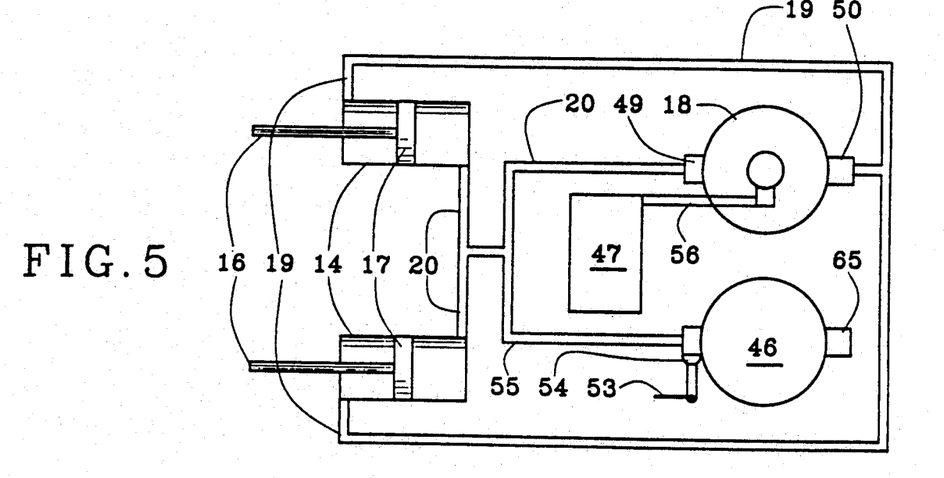
FIG. 5 is a schematic representation of the flow diagram of the hydraulic system for up-and-down actuation of the stop-support wheels.

When hydraulic fluid is pressured by the accumulator 46 into wheels-down lines 20, fluid in the cylinder 14 and in the wheels-up line is directed into overflow tank 47 until re-circulated by re-activation of pump 18 with electrical current. Fluid pressured from accumulator 46 can be directed through accumulator lines 55 to wheels-down line 20. Overflow fluid can be directed to the overflow tank 47 through over line 56 in traverse of the pump 18 and valves 49 and 50 with one-way-valve action in relation to accumulator-pressured fluid.

The accumulator 46 can be any known type such as air-pressured with a separate motor or fluid-pressured with fluid from pump 18 against either a resilient member or against sealed air or other gas for accumulated resilience. Types of accumulators which do not release gas into the lines are preferable.

Figure 4:
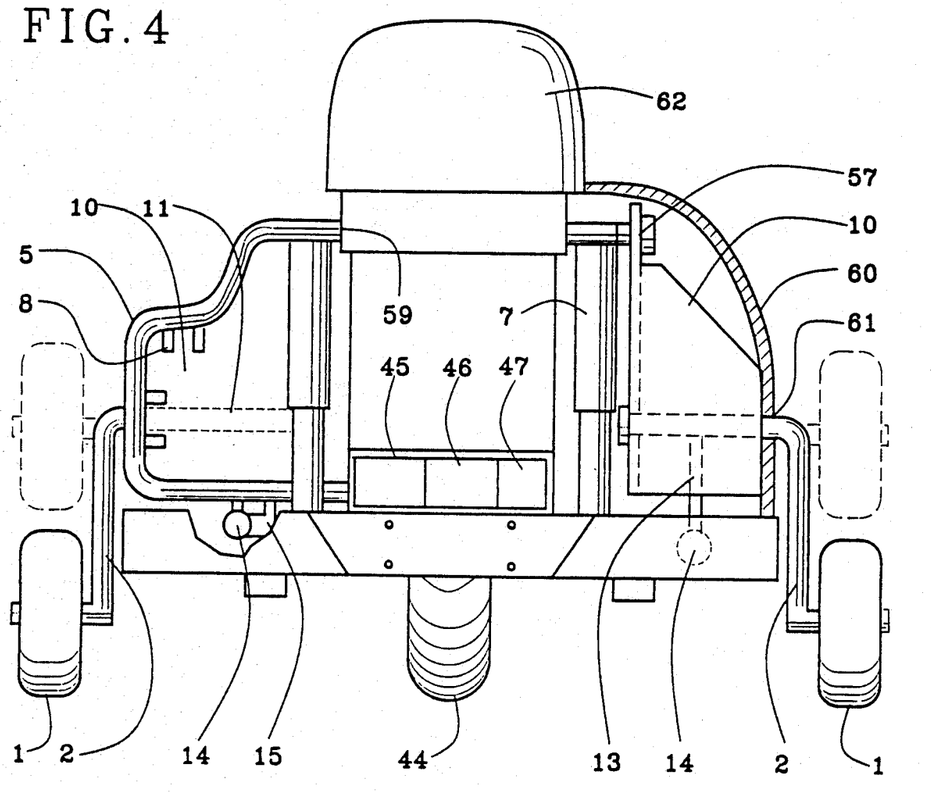
FIG. 4 is is a cutaway rear view of a motorcycle with outside components omitted for illustrating the stop-support wheels in a down position in solid lines and in a retracted position in dashed lines. The left side of FIG. 4 illustrates a mounting bracket attached to a crash bar. The right side illustrates a mounting bracket attached to a motorcycle without a crash bar and with a cross-section of streamlined covering integrated with the structure of the motorcycle.

Referring now to FIG. 4, when crash bar 5 is not available or if available, is not suitable for support of attachment bracket 3, the the attachment bracket 3 can be bolted or otherwise attached with bolting means in the vicinity of shock-absorber attachments 57. All known motorcycles provide bottom-crash-bar and footrest bolting means 58 near the bottom of both sides of frame 4. The also provide top-crash-bar bolting means 59 in the vicinity of the shock-absorber attachments 57.

The attachment bracket can be attached to the frame 4 independently of whether or not there are crash bars on particular motorcycles. The left side of FIG. 4 illustrates a rear view of an attachment bracket 3 clamped to a crash bar 5. The right side of FIG. 4 illustrates a rear view of an attachment bracket 3 shaped appropriately and attached to bolting means 59 at the top and to the frame 4 at the bottom as illustrated in FIG. 1. Also illustrated in FIG. 4 is a representative motorcycle covering 60 that is used on some present models of motorcycles. Motorcycles which have the covering 60 in a streamline form over the frame 4 also may have crash bars that are not suitable for attachment of the bracket 3. Beneath the cover 60 however, are the same mounting means 58 and 59 to which an appropriately-shaped bracket 3 can be attached. In conformity with the streamlined contouring of the covering 60, an appropriate strut-pivot-axle orifice 61 can be provided for inserting the strut-pivot axle 11 into strut-pivot bearing member 9 without any of the attachment mechanism visible or in a position to obstruct streamline effects of the covering 60. The back of a driver's seat 62 is shown in FIG. 4, but rear fenders, baggage containers and a passenger seat 63 have been omitted to illustrate the components of this invention. Above a rear bumper 64 available on some large touring motorcycles is a convenient position for the hydraulic case 48.

It can be observed in FIG. 4 that stop-support wheels 1 can provide a measure of safety even when in a wheels-up position. They can be made to protrude far enough to the sides to prevent a motorcycle from falling completely on its side. This also prevents a motorcycle from pinning an individual under it easily. Further, it holds the motorcycle in a partially-tipped position from which it can be uprighted with relatively little effort. When traveling at wheels-up speeds, the wheels 1 can be carried at selectively low positions to further aid balancing and tipping for turning, provided extreme tipping is not required. Typically for touring travel on large, heavy motorcycles, extreme tipping is not encountered or necessary.

The tires on wheels 1 can be relatively straight-bottomed rather than round-bottomed as illustrated in FIG. 4 for the motorcycle wheel 44 in comparison to a stop-support wheel 1.

FIG. 5 illustrates in schematic flow diagram the components of the hydraulic system described above. In addition is an accumulator-charge valve 65 through which pressured gas or liquid is directed under pressure into the accumulator 46. Hydraulic lines are fluid conduits referred to in common vernacular. Fluid pressured from pump 18 with valve 49 open is directed through wheels-down lines or conduits 20 to wheels-down-line attachment 22 at cylinder 14 to lower the wheels 1. To raise the wheels 1, either the electrical pump motor 45 or the pump 18 can be reversed to cause fluid to flow under pressure the opposite direction through valve 50 and wheels-up lines or conduits 19. The piston 17 is caused thereby to travel in the direction of fluid flow for raising and lowering the struts 2 and wheels 1 attached accordingly. For emergency lowering of the wheels 1, emergency handle 52 is operated to open accumulator-release valve 54 with emergency-wheels-down line 55. Fluid, either gas or liquid, released from accumulator 46 enters wheels-down line 20 through accumulator line 55. Appropriately-operated valve 49 prevents fluid from returning to the pump 18 through wheels-down line 20 while allowing the fluid to flow through appropriately-operated valve 50 from wheels-up line 19, through the pump or a pump reservoir if employed and into the overflow tank 47. The accumulator can be recharged through accumulator-charge valve 65.

Figure 6:
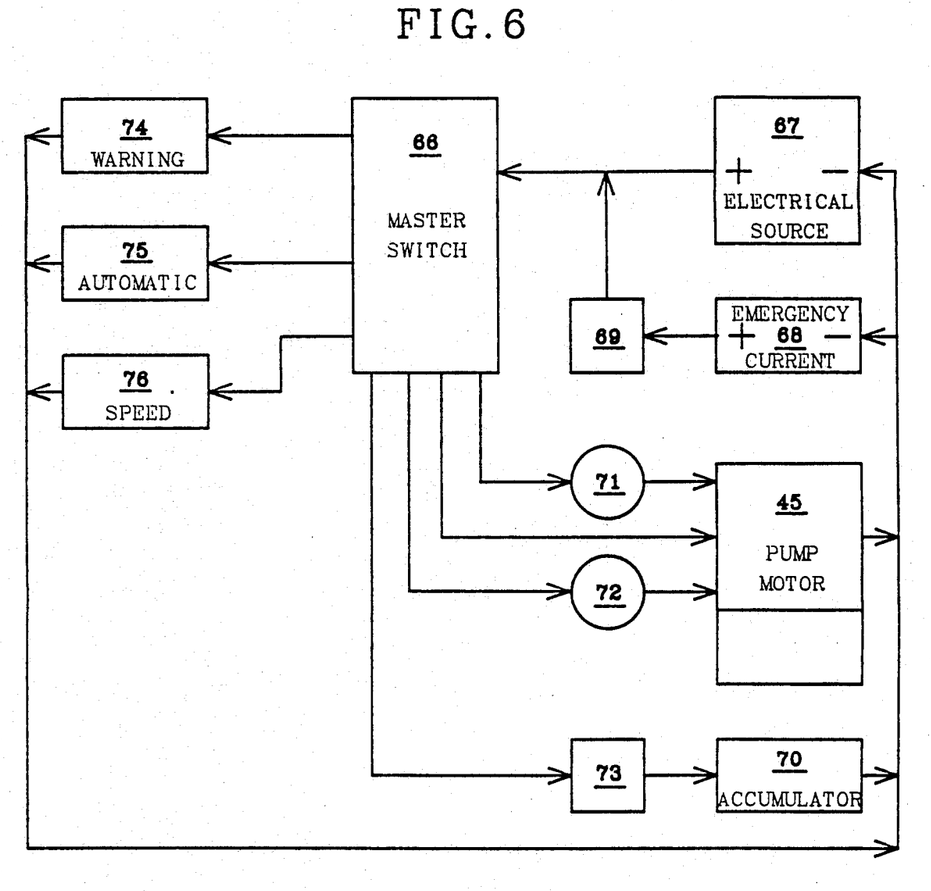
FIG. 6 is a schematic diagram of the electrical system employed to actuate the hydraulic mechanism for retracting and extending stop-support wheels.

Referring now to FIG. 6 electrical-control diagram, a master switch 66 receives electrical current from an electrical-supply source 67, or from an optional emergency electrical-supply source 68, and directs it selectively throughout the electrical system. The optional emergency electrical-supply source can be turned on with emergency switch 69. The fundamental use of the current is to operate pump motor 45 and optionally electrically-operated accumulator motor 70. To operate motors 45 and 70 with desired selectivity, however, electrical controls are employed in the following manner.

A predetermined low-voltage wheels-up relay switch or solenoid 71 and wheels-down relay switch or solenoid 72 direct predetermined higher-voltage current to optionally reversible pump motor 45. If a non-reversible pump motor 45 is employed with reversible gears for the pump 18, then current can be directed from either the master switch 66 or form a single relay switch 71. If an electrically-operated accumulator 46 is employed, current is directed to accumulator motor 70 in accordance with requirements relayed by pressure-sensitive relay switch 73. Return current from low-voltage relay switches and high-voltage motors can be routed to the electrical-supply sources 67 and 68 as diagrammed with directional arrows and electrical-flow lines.

Panel indicator lights 74 for manual control and optionally automated controls 75 are supplied with current through the master switch 66 with control feedback information to the master switch. The master switch can be a multi-functional single unit which includes the function of pump switch 51 or multiple single-function switches of conventional design. The panel indicator lights 74 can indicated whether left and right wheels 1 are up or down. This allows a motorcycle driver to actuate lowering or raising of the wheels 1 by choice. If automated controls 75 are employed, they can be turned off and on at the master switch. If turned on, the automated controls 75 can be set to raise or lower the wheels according to selected speed of the motorcycle by a speedometer-actuated relay switch 76. The master switch 66 and optional unit switches can be positioned variously with respect to handlebars 77 and a front panel section 78. An emergency handle could be positioned on the left handlebar with manual functions of up-and-down switching with the master switch positioned on the right handlebar. The automated controls can be positioned at a front panel section 78 at the center of the handlebars or on a suitable from section of the frame 4. The speedometer-relay switch can be positioned in proximity to a speedometer.

The panel indicator lights 74 can function also as an indicator of whether the electrical system is functioning. If the panel indicator lights do not turn on with actuation of the master switch, then the motorcycle should no be ridden in wheels-up mode by a person who cannot maintain the motorcycle in an upright position without the stop-support wheels 1. If the panel lights cease to function while driving and it is necessary for a driver to utilize the stop-support wheels 1, then the emergency handle 52 can be utilized to actuate the accumulator-release valve 54 when the vehicle speed is selectively low and the operating terrain is sufficiently smooth and horizontal.

Figure 3:
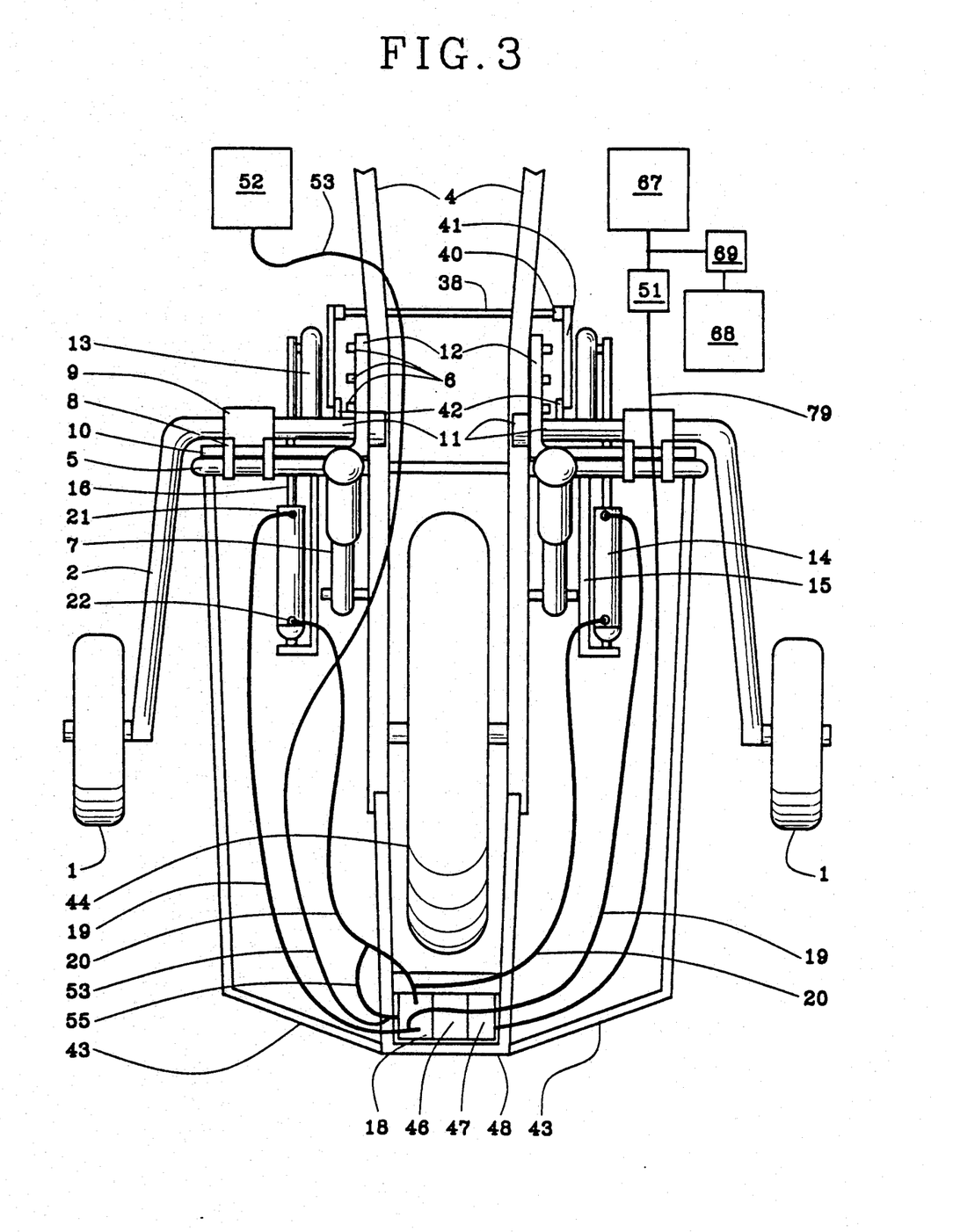
FIG. 3 is a top sectional view of the rear section of a motorcycle with seat, baggage compartments and covering components omitted for exposing components of the invention.
Figure 7:
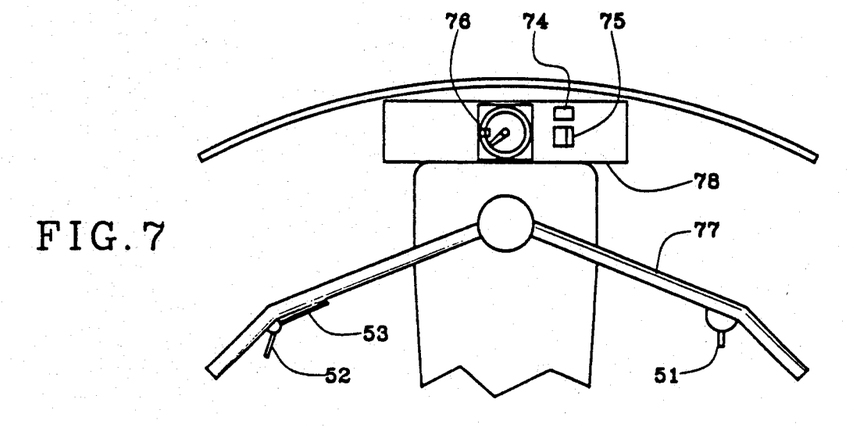
FIG. 7 is a top view of stop-support-wheel controls at the front section of a motorcycle with a windshield and control panel attached to the frame.

FIG. 7 illustrates preferred positioning of the panel lights 74, the automated controls 75, the speedometer-actuated relay switch 76, the pump switch 51 and the emergency handle 52 in relationship with the handlebars 77 and a front panel section 78. The switches, exclusive of the emergency handle, can be integrated into one master switch 66 represented and described in relation to FIG. 6, or alternatively, separated as individual control units as shown in FIG. 7. If a single master switch 66 is employed, it can be positioned in the panel section 78 in the vicinity of where automated controls 75 are depicted with current conveyed through power line 79 as illustrated in FIG. 3.

In conclusion, a motorcycle stop-support wheel mechanism with great merit and utility has been invented and described. All foreseeable variations, modifications and forms of the invention as described in the following claims are included in the invention.

Having thus described my invention, I claim:

1. In a motorcycle having a front and a back wheel, a motorcycle stop-support wheel assembly comprising:
 a mounting bracket attachable to each side of a frame of the motorcycle;
 a stop-support-wheel strut with a stop-support wheel rotatably attachable to a wheel end and an opposite end pivotally attachable to each mounting bracket in pivotal relationship between a retracted stop-support-wheel position and an extended down stop-support-wheel position in which the axis of each stop-support wheels are in the same vertical plane as the axis of the back wheel of the motorcycle;
 a double-acting piston in an opposed-direction hydraulic actuation cylinder swivelably attachable to an actuation-cylinder bracket that is attachable in rigid relationship to each mounting bracket;
 an actuation-cylinder piston shaft extended from each double-acting piston;
 a strut-actuation member on each strut attached pivotally to each piston shaft;
 a fluid-pressurization pump attachable to the motorcycle;
 a wheels-down fluid conduit in fluid communication between the fluid-pressurization pump and a wheels-down pressurization end of each actuation cylinder;
 a wheels-up fluid conduit in fluid communication between the fluid-pressurization cylinder and a wheels-up pressurization of each actuation cylinder;
 a fluid-pressurization control position in driver-operable proximity to handlebars of the motorcycle;
 a support-wheel-strut parallel-position control; and
 a lowered-stop-support-wheel-position lock.

2. A motorcycle stop-support-wheel assembly according to claim 1 wherein the mounting bracket attachable to each side of the motorcycle frame is a dihedral-angled-plate member with a frame plate boltable to a motorcycle frame in the vicinity of a crash-bar mounting means and a crash-bar plate attachable to a crash bar that is attached to the motorcycle frame.

3. A motorcycle stop-support-wheel assembly according to claim 2 wherein the stop-support-wheel strut is angled selectively with an axis leg of the strut swivelably attachable to the crash-bar plate and anchored in swivelable relationship to the frame plate of the dihedral-angled-plate member.

4. A motorcycle stop-support-wheel assembly according to claim 3 wherein the stop-support-wheel-strut parallel-position control is a cross-over rod extended from side-to-side of the motorcycle in swivel-control mechanical relationship between the stop-support-wheel strut at one side of the motorcycle and the stop-support-wheel strut at the opposite side of the motorcycle.

5. A motorcycle stop-support-wheel assembly according to claim 4 wherein a strut-actuation member is extended selectively downwardly and forwardly from the axis leg of the stop-support-wheel strut with a strut-actuation end attachable pivotally to each actuation-piston shaft.

6. A motorcycle stop-support-wheel assembly according to claim 5 wherein the lowered-stop-support-wheel-position lock is comprised of:
- a rear lock member attachable swivelably to a front surface of the crash-bar plate;
- a front lock member attachable swivelably to the strut-actuation member and to the rear lock member;
- a lock shoulder on the front lock member;
- a swivelable connection of the rear lock member and the front lock member at a position off-centered from a plane of swivelable connection of the rear lock member to the crash-bar plate and swivelable connection of the front lock member to the strut-actuation member when a front shoulder of the rear lock member is buttressed against a rear surface of the lock shoulder on the front lock member;
- an actuation-cylinder bracket attachable below and to the rear of the crash-bar plate;
- a piston-shaft connection slot in the piston-shaft connection member;
- a piston-shaft connection shoulder;
- a piston-shaft pivot member in slidable and swivelable contact with the piston-shaft connection slot;
- a front-lock-member unlock-cam member extended from the front lock member selectively in the direction of the piston-shaft connection shoulder;
- a connection-shoulder unlock cam member extended from the piston-shaft connection shoulder selectively in the direction of the front-lock-member unlock cam; and
- a lock holding arm on the rear lock member biased with a resilience member in a pivotal direction towards the connection-shoulder unlock cam.

7. A motorcycle stop-support-wheel assembly according to claim 6 and further comprising;
- a fuel-pump-shut-off switch with an activating member positioned to be operated by contact with the rear-lock member as the front-lock member and the rear-lock member are pivoted to locking arrangement.

8. A motorcycle stop-support-wheel assembly according to claim 1 wherein the mounting bracket attachable to each side of the motorcycle frame is a dihedral-angled-plate member with a frame plate attachable to a motorcycle frame in the vicinity of upper and lower mounting means in relation to a crash-bar mounting means and a strut-attachment plate extended outwardly from the motorcycle frame.

9. A motorcycle stop-support-wheel assembly according to claim 8 wherein the stop-support-wheel strut is angled selectively with an axis leg of the strut swivelably attachable to the strut-attachment plate and anchored in swivelable relationship to the frame plate of the dihedral-angled-plate member.

10. A motorcycle stop-support-wheel assembly according to claim 9 wherein a strut-actuation member is extended selectively downwardly and forwardly from the axis leg of the stop-support-wheel strut with a strut-actuation end attachable pivotally to each actuation-piston shaft.

11. A motorcycle stop-support-wheel assembly according to claim 10 wherein the lowered-stop-support-wheel-position lock at each side of the motorcycle is comprised of:
- a rear lock member attachable swivelably to a front surface of the strut-attachment plate;
- a front lock member attachable swivelably to the strut-actuation member and to the rear lock member;
- a lock shoulder on the front lock member;
- a swivelable connection of the rear lock member and the front lock member at a position off-centered from a plane of swivelable connection of the rear lock member to the strut-attachment plate and swivelable connection of the front lock member to the strut-actuation member when a front shoulder of the rear lock member is buttressed against a rear surface of the lock shoulder on the front lock member;
- an actuation-cylinder bracket attachable below and to the rear of the strut-attachment plate;
- a piston-shaft connection slot in the piston-shaft connection member;
- a piston-shaft connection shoulder;
- a piston-shaft pivot member extended in slidable and swivelable contact with the piston-shaft connection slot;
- a front-lock-member unlock cam member extended from the front lock member selectively in the direction of the piston-shaft connection shoulder;
- a connection-shoulder unlock cam member extended from the piston-shaft connection shoulder selectively in the direction of the front-lock-member unlock cam; and
- a lock-holding arm on the rear lock member biased with a resilience member in a pivotal direction towards the connection-shoulder unlock cam.

12. A motorcycle stop-support-wheel assembly according to claim 11 and further comprising:
- a fuel-pump-shut-off switch with an activating member positioned to be operable by contact with the rear lock member as the front lock member and the rear lock member are positioned in locking arrangement.

13. A motorcycle stop-support-wheel assembly according to claim 11 wherein the stop-support-wheel-strut parallel-position control is a cross-over rod extended from side-to-side of the motorcycle in swivel-control mechanical relationship between the stop-support wheel strut at the opposite side of the motorcycle.

14. A motorcycle stop-support-wheel assembly according to claim 12 and further comprising;
- a fluid reservoir in fluid communication with the fluid-pressurization pump and the wheels-up and the wheels-down fluid conduits;
- a pressurized-fluid accumulator in fluid communication with the wheels-down fluid conduit and having pressure-resistance capacity selectively less than pressure-generation capacity of the fluid-pressurization pump;

an accumulator-charging valve in fluid-pressure-control relationship between the fluid reservoir and the accumulator;

a fluid-overflow tank in fluid communication with the reservoir and having a volumetric capacity selectively greater than the volumetric capacity of the accumulator;

an accumulator outlet valve in fluid-flow-control relationship between the accumulator and the wheels-down fluid conduit;

an accumulator-outlet-valve control in the driver-operable position in relation to handlebars of the motorcycle; and an emergency reservoir-bypass conduit with a bypass valve in communication between the wheels-up conduits and the fluid-overflow tank when the accumulator outlet valve is actuated.

15. A motorcycle stop-support-wheel assembly according to claim 14 and further comprising:

a fuel-pump-shut-off switch with an activating member positioned to be operated by contact with the rear lock member as the front lock member and the rear lock member are pivoted to locking arrangement.

16. A motorcycle stop-support-wheel assembly according to claim 1 further comprising:

a strut-position-locking valve in the wheels-up and wheels-down conduits; and an electrically-operable control of the strut-position-locking valve powered by a central electrical system of the motorcycle and positioned in driver-operable position in relationship to handlebars of the motorcycle.

17. A motorcycle stop-support-wheel assembly according to claim 16 and further comprising:

an emergency electrical supply source in electrical communication with the strut-position-locking valve and the electrically-operable control in driver-operable position in relationship to handlebars of the motorcycle.

18. A motorcycle stop-support-wheel assembly according to claim 16 and further comprising:

selectively lowered-and-retracted strut-position indicators at the electrically-operable control.

19. A motorcycle stop-support-wheel assembly according to claim 16 and further comprising:

an automatic electrical-switch shut-off of fluid pressurization and actuation of strut-position-locking valves at extreme wheels-down and wheels-up ends of travel of the strut at each side of the motorcycle.

20. A motorcycle stop-support-wheel assembly according to claim 16 further comprising:

a variable motorcycle-speed-operated and on-and-off switchable electrical control of wheels-down and wheels-up operation of the stop-support-wheel struts.

21. In a motorcycle having a front and back wheel, a motorcycle stop-support wheel assembly comprising:

a mounting bracket attachable to each side of a frame of the motorcycle;

a stop-support-wheel strut with a stop-support wheel rotatably attachable to a wheel end and an opposite end pivotally attachable to each mounting bracket in pivotal relationship between a retracted stop-support-wheel position selectively above the bottom of the motorcycle and a lowered stop-support-wheel position in which the axes of the stop-support wheels and the rear wheel of the motorcycle are parallel in a plane perpendicular to a common horizontal plane that is tangent to the outside diameter of the rear wheel of the motorcycle;

a double-acting piston in an opposed-direction hydraulic actuation cylinder swivelably attachable to an actuation-cylinder bracket that is attachable in rigid relationship to the mounting bracket at one side of the motorcycle;

an actuation-cylinder piston shaft extended from the double-acting piston;

a strut-actuation member attached pivotally to the piston shaft;

a fluid-pressurization pump attachable to the motorcycle;

a wheels-down fluid conduit in fluid communication between the fluid-pressurization pump and a wheels-down pressurization end of the actuation cylinder;

a wheels-up fluid conduit in fluid communication between the fluid-pressurization pump and a wheels-up pressurization end of the actuation cylinder;

a fluid-pressurization control positioned in driver-operable proximity to handlebars of the motorcycle;

a lowered-stop-support-wheel-position lock; and a cross-over rod extended from side-to-side of the motorcycle in swivel-control mechanical relationship between the stop-support-wheel strut at one side of the motorcycle and the stop-support-wheel strut at the opposite side of the motorcycle.

22. A motorcycle stop-support-wheel assembly according to claim 21 wherein the mounting bracket attachable to each side of the motorcycle frame is a dihedral-angled-plate member with a frame plate boltable to a motorcycle frame in the vicinity of a crash-bar mounting means and a crash-bar plate attachable to a crash bar that is attached to the motorcycle frame.

23. A motorcycle stop-support-wheel assembly according to claim 21 wherein the mounting bracket attachable to each side of the motorcycle frame is a dihedral-angled-plate member with a frame plate attachable to a motorcycle frame in the vicinity of upper and lower mounting means in relation to a crash-bar mounting means and a strut-attachment plate extended outwardly from the motorcycle frame.

24. A motorcycle stop-support-wheel assembly according to claim 21 wherein a strut-actuation member is extended selectively downwardly and forwardly from an axis leg of the stop-support-wheel strut with a strut-actuation end attachable pivotally to the actuation-piston shaft.

25. A motorcycle stop-support-wheel assembly according to claim 24 wherein the lowered-stop-support-wheel-position lock is comprised of:

a rear lock member attachable swivelably to a front surface of the crash-bar plate;

a front lock member attachable to the strut-actuation member and to the rear lock member;

a lock shoulder on the front lock member;

a swivelable connection of the rear lock member and the front lock member at a position off-centered from a plane of swivelable connection of the rear lock member to the crash-bar plate and swivelable connection of the front lock member to the strut-actuation member when a front shoulder of the rear lock member is buttressed against a rear surface of the lock shoulder on the front lock member;

an actuation-cylinder bracket attachable below and to the rear of the crash-bar plate;

a piston-shaft connection slot in the piston-shaft connection member;

a piston-shaft connection shoulder;

a piston-shaft pivot member in slidable and swivelable contact with the piston-shaft connection slot;

a front-lock-member unlock-cam member extended from the front lock member selectively in the direction of the piston-shaft connection shoulder;

a connection-shoulder unlock cam member extended from the piston-shaft connection shoulder selectively in the direction of the front-lock-member unlock cam; and a lock holding arm on the rear lock member biased with a resilience member in a pivotal direction towards the connection-shoulder unlock cam.

26. A motorcycle stop-support-wheel assembly according to claim 25 and further comprising:

a fluid-pump-shut-off switch with an activating member positioned to be operated by contact with the rear-lock member as the front-lock member and the rear-lock member are swiveled to locking arrangement.

27. A motorcycle stop-support-wheel assembly according to claim 21 wherein the stop-support-wheel strut is angled selectively with an axis leg of the strut swivelably attachable to the strut-attachment plat and anchored in a swivelable relationship to the frame plate of the dihedral-angled-plate member.

28. A motorcycle stop-support-wheel assembly according to claim 21 and further comprising:

a fluid reservoir in fluid communication with the fluid-pressurization pump and the wheels-up and the wheels-down fluid conduits;

a pressurized-fluid accumulator in fluid communication with the wheels-down fluid conduit;

an accumulator-charging valve in fluid-pressure-control relationship between a fluid reservoir and the accumulator;

a fluid-overflow tank in fluid communication with the reservoir;

an accumulator outlet valve in fluid-flow-control relationship between the accumulator and the wheels-down fluid conduit;

an accumulator-outlet-valve control in driver-operable position in relation to the handlebars of the motorcycle; and an emergency reservoir-bypass conduit with a bypass valve in communication between the wheels-up conduit and the fluid-overflow tank when the accumulator is actuated.

29. A motorcycle stop-support-wheel assembly according to claim 21 and further comprising:

a strut-position-locking valve in the wheels-up and wheels-down conduits and;

an electrically-operable control of the strut-position-locking valve powered by a central electrical system of the motorcycle and positioned in driver-operable position in relationship to handlebars of the motorcycle.

30. A motorcycle stop-support-wheel assembly according to claim 29 and further comprising:

and emergency electrical-supply source in electrical communication with the strut-position-locking valve and the electrically-operable control in driver-operable position in relationship to handlebars of the motorcycle.

31. A motorcycle stop-support-wheel assembly according to claim 29 and further comprising:

selectively lowered-and-retracted strut-position indicators at the electrically-operable control.

32. A motorcycle stop-support-wheel assembly according to claim 29 and further comprising:

an automatic electrical-switch shut-off of fluid pressurization and actuation of strut-position-locking valves at extreme wheels-down and wheels-up ends of travel of the strut at each side of the motorcycle.

33. A motorcycle stop-support-wheel assembly according to claim 29 and further comprising:

a variable motorcycle-speed-operated and on-and-off switchable electrical control of wheels-down and wheels-up operation of the stop-support-wheel struts.

* * * * *